United States Patent [19]

Marshall et al.

[11] Patent Number: 4,580,443
[45] Date of Patent: Apr. 8, 1986

[54] DETECTING LEAKS

[75] Inventors: Peter E. G. Marshall, Stratford-on-Avon; Francis R. Piper, Evesham; David J. Bray, Bromsgrove; John F. Wilson, Thornbury, all of England

[73] Assignee: BL Technology Limited, London, England

[21] Appl. No.: 571,664

[22] Filed: Jan. 17, 1984

[30] Foreign Application Priority Data

Jan. 19, 1983 [GB] United Kingdom ............... 8301408

[51] Int. Cl.⁴ .............................................. G01N 3/20
[52] U.S. Cl. .................................................. 73/40.7
[58] Field of Search ................ 73/40.7, 46, 49.2, 49.3

[56] References Cited

U.S. PATENT DOCUMENTS

| | | | |
|---|---|---|---|
| 3,645,127 | 2/1972 | Mongodin et al. | 73/40.7 |
| 4,083,231 | 4/1978 | Mennenga | 73/40.7 |
| 4,477,986 | 10/1984 | Marshall et al. | 73/40.7 |

Primary Examiner—Thomas Wyse
Attorney, Agent, or Firm—Thomas J. Greer, Jr.

[57] ABSTRACT

A leak detector has a gas probe 1 for sensing signal gas escaping from an enclosure containing that gas at a pressure slightly in excess of ambient surrounded by a curtain of barrier gas. The reading of a gas analyzer such as a mass spectrometer depends on the height of the probe from the surface. A height sensor is attached to the leak detector and a programmable amplifier 6 contains information on the characteristic curve of the gas sensor. An output signal from the programmable amplifier compensates for the height of the probe from the surface being detected. The speed of the leak detector can be corrected for in the same way.

7 Claims, 6 Drawing Figures

DETECTING LEAKS

This invention relates to leak detection and especially to leak detection involving the detection of a signal gas contained in an enclosure and at a pressure in excess of ambient, for the purpose of detecting imperfect seals and seams in the enclosure.

For the purpose of distinguishing between signal gas emerging from a leak and signal gas which may have built up in the area of the enclosure being tested from other leaks, it has been proposed to provide a circular opening surrounding a sampling probe through which circular opening barrier gas can be fed (the Applicant's European patent application No. 0064880 and the Applicant's co-pending British patent application No. 80/01407 (P1524).

The invention provides a leak detector comprising a signal gas probe, a cirular opening surrounding the probe through which circular opening barrier gas can be fed, means for sensing the height of the leak detector from the surface being tested, and means for correcting the signal from the leak detector to take account of the height of the leak detector from the surface.

Such a detector can operate within a range of heights from the surface being tested, and it is not necessary to attempt to guide the leak detector at a constant height from that surface.

Advantageously the correcting means is arranged to correct the signal to the value which would have been produced if the same leak were sensed at a reference height above the surface and, in order to achieve this, the correcting means may include a memory storing signals produced for different heights of the leak detector for a given leak.

Advantageously there is provided means for sensing the speed of the leak detector along the surface being tested, and means for correcting the signal from the leak detector to take account of the speed of the leak detector along the surface.

The invention also provides a leak detector comprising a signal gas probe, a circular opening surrounding the probe through which circular opening barrier gas can be fed, means for sensing the speed of the leak detector along the surface being tested, and means for correcting the signal from the leak detector to take account of the speed of the leak detector along the surface.

A leak detector constructed in accordance with the invention will now be described by way of example with reference to the accompanying drawings, in which.

Figure 1:
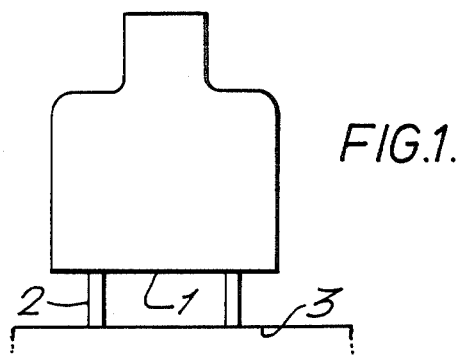
FIG. 1 is a schematic view of the leak detector adjacent a surface.

Referring to FIG. 1, the leak detector is intended to be used for the detection of leaks from an enclosure 3 which contains signal gas at a pressure slightly in excess of ambient. The detector is moved over the surface of the enclosure within a range of height (2–25 mm) from the surface. A curtain of barrier gas 2 of substantially laminar flow surrounds probe 1 of the detector, the barrier gas being air and the signal gas being air to which a small amount of helium has been added. The probe is a capillary tube connected by a flexible hose to an analyser. The detector is described in greater detail in our co-pending British patent application Ser. No. 571,665, filed Jan. 17, 1984. The analyser is a mass spectrometer.

Figure 2:
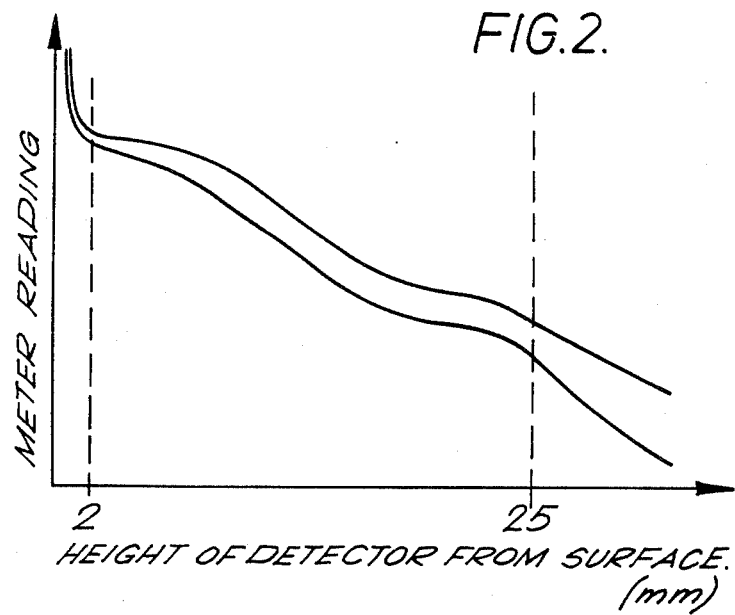
FIG. 2 shows a characteristic curve of the leak detector.

A characteristic curve of the mass spectrometer is shown in FIG. 2, where the meter reading of the spectrometer for a given leak is measured for a succession of different heights of the leak detector from the surface being tested. It is found that a range of characteristic curves are obtained, the extreme values follow each other over roughly the same curvature between 2 mm and 25 mm from the surface, but above the latter limit they diverge.

Figure 4:
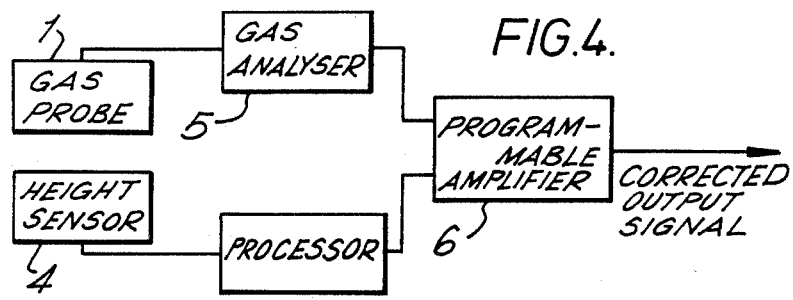
FIG. 4 is a block diagram of a first correction circuit.

Referring to FIG. 4, a knowledge of the characteristic curve enables the detector to be used withing the range of heights 5–25 mm while compensating for the fact that the leak detector is more sensitive closer to the surface than it is further away. This is achieved by means of a height sensor 4 attached to the leak detector. Its output is fed via a processing circuit together with the output of the gas analyser or mass spectrometer 5 to a programmable amplifier 6 which contains the median of the two characteristic curves shown in FIG. 2. For example, the programmable amplifier may include a PROM preceded and suceeded by digital/analogue converters.

The corrected output signals coming from the programmable amplifier 6 accordingly will take account of the actual height of the detector from the surface in question, making this more accurate and at the same time easier to guide since an exact height above the surface need not be kept to.

Figure 5:
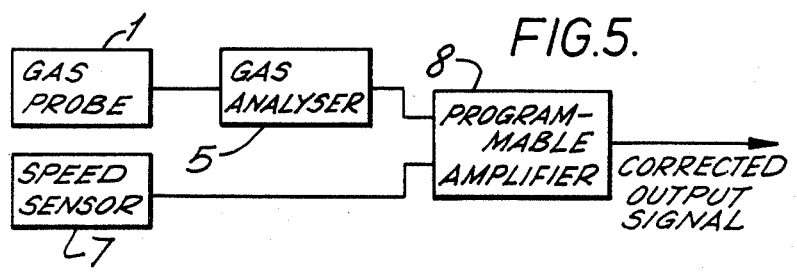
FIG. 5 is a block diagram of a second correction circuit.
Figure 3:
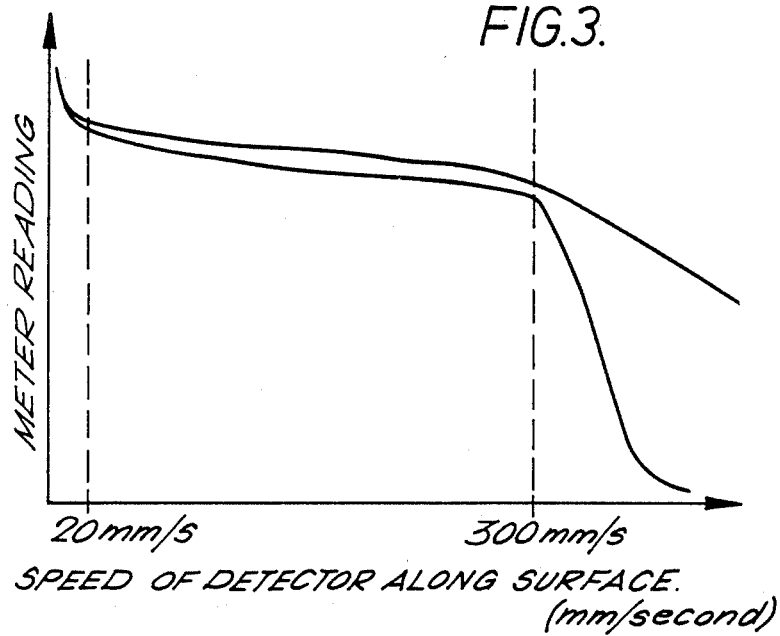
FIG. 3 shows another characteristic curve of the leak detector.

Referring to FIG. 3, the characteristic curve of a mass spectrometer for different speeds of the detector along the surface is shown and, as with FIG. 2, within a range of speeds (20 mm per second to 300 mm per second) the extreme values of the characteristic curves obtained follow each other quite closely and outside that region they tend to diverge. Referring to FIG. 5, a median value between the extreme values of FIG. 3 is stored in the programmable amplifier and a speed sensor on the leak detector feeds speed information into the amplifier and enables it to correct the output of the gas analyser.

Figure 6:
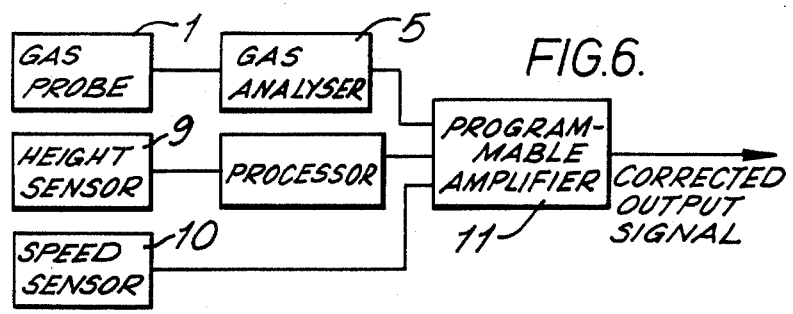
FIG. 6 is a block diagram of a third correction circuit.

Referring to FIG. 6, the leak detector is provided with both a height sensor 9 and a speed sensor 10, and the programmable amplifier contains details of both the characteristic curves shown in FIGS. 2 and 3. In this case the readings of the gas analyser obtained from the signal gas incident on the sensor 1 are corrected in the programmable amplifier 11 for both height and speed.

The height sensors 4, 9 are inductive devices, wherein a loop is fed with alternating current at a frequency within the range 2 to 30 kHz. On the assumption that the surface being tested is metal, varying amounts of power are dissipated in the loop depending on the height of the sensor from the metal surface (varying amounts of power being absorbed in the metal).

As an alternative to an inductive height sensor, an ultrasonic or optical height sensor could be used.

The speed sensor 7, 10 in the case of the leak detector mounted on the arm of a robot on an automotive assembly line, may take the speed measurement from the robot, or an accelerometer may be used.

As mentioned in greater detail in our co-pending British patent application Ser. No. 571,665, filed Jan. 17, 1984, the leak detector is especially suited to detecting leaks from vehicle bodies to test for imperfect welds and badly fitting door and window seals.

We claim:

1. A leak detector comprising a probe for producing a signal when the presence of a signal gas is detected, a circular opening surrounding the probe through which barrier gas can be fed, means for sensing the height of the leak detector from the surface being tested, and height correcting means for storing information on the relationship between the signal produced by the detector for a given leak and the height of the detector above the surface and for correcting the signal produced by the detector in dependence upon a comparison between the sensed height and a reference height.

2. A leak detector as claimed in claim 1, wherein the height correcting means comprises a programmable amplifier.

3. A leak detector as claimed in claim 2, wherein the means for sensing the height of the detector comprises an inductive device.

4. A leak detector as claimed in claim 1, wherein there is provided means for sensing the speed of the leak detector along the surface being tested, and speed correcting means for storing information on the relationship between the signal produced by the detector for a given leak and the speed of the detector along the surface and for correcting the signal produced by the detector in dependence upon a comparison between the sensed speed and a reference speed.

5. A leak detector as claimed in claim 4, wherein the speed correcting means comprises a programmable amplifier.

6. A leak detector comprising a probe for producing a signal when the presence of a signal gas is detected, a circular opening surrounding the probe through which barrier gas can be fed, means for sensing the speed of the leak detector along the surface being tested, and speed correcting means for storing information on the relationship between the signal produced by the detector for a given leak and the speed of the detector along the surface and for correcting the signal produced by the detector in dependence upon a comparison between the sensed speed and a reference speed.

7. A leak detector as claimed in claim 6, wherein the speed correcting means comprises a programmable amplifier.

* * * * *